Patented Jan. 23, 1945

2,368,042

UNITED STATES PATENT OFFICE 2,368,042

PROCESS FOR PRODUCING NEUTRAL CALCIUM HYPOCHLORITE

Homer Louis Robson, Lewiston, N. Y., assignor to The Mathieson Alkali Works, Inc., New York, N. Y., a corporation of Virginia No Drawing. Application January 21, 1942, Serial No. 427,589

11 Claims. (Cl. 23—86)

This invention relates to the production of neutral calcium hypochlorite and provides an improved method of preparing slurries thereof having advantageous filterability characteristics.

The general method of producing calcium hypochlorites consists essentially of chlorinating lime slurries whereby the lime is converted to hypochlorite which crystallizes to form slurries of hypochlorite crystals. The hypochlorite crystals are customarily recovered from the mother liquor by filtration or centrifuging. Though this method has long been known, its practical application to the production of neutral calcium hypochlorite has presented many difficulties.

For example, it has been known that milk of lime can be chlorinated at ordinary temperatures. However, under such conditions, basic hypochlorite compounds are formed which have been found objectionably to thicken the slurry so that chlorination could not be carried on satisfactorily. The usual procedure is to conduct the first stage of the chlorination at an elevated temperature, for example 30 to 45° C., at which temperature the dibasic calcium hypochlorite compound, $Ca(OCl)_2.2Ca(OH)_2$, is formed. The dibasic compound crystallizes in hexagonal plates and does not objectionably thicken the slurry.

If the chlorination is carried further toward completion at such elevated temperatures, a precipitation of the hemibasic hypochlorite compound occurs. This compound has been variously termed "monobasic," "two thirds basic," etc. However, I have found the composition of this compound to be in accordance with the formula, $2Ca(OCl)_2.Ca(OH)_2$. This hemibasic compound forms in pointed lath-like crystals and these interfere with the growth of crystals of the neutral calcium hypochlorite, $Ca(OCl)_2.2(H_2O)$, upon further chlorination.

In some operations the chlorination is stopped while the solids present in the slurry are predominantly the hemibasic compound which has been found to be generally more filterable than the neutral compound resulting from further chlorination of the hemibasic slurry. By other procedures the partly chlorinated slurry in which the solids present are predominantly the dibasic compound, is cooled to 15 to 25° C. and the chlorination continued toward completion. While a slurry of the neutral compound may be obtained by this latter procedure, the neutral compound thus produced is in the form of fine crystals and the slurry thereof is difficult to filter.

One reason for the small size of the crystals of the neutral compound formed by the procedure just outlined is the tendency of the slurry to become supersaturated and then to form many very small crystals of the neutral hypochlorite which cannot be grown to satisfactory size for filtering during the completion of the chlorination. To reduce this tendency, it has been proposed to form the neutral compound in the presence of previously formed crystals of the neutral compound. Following this procedure, it has been found necessary to employ very large amounts of seed crystals in order to avoid the formation of small crystals due to spontaneous crystallization. Amounts of seed crystals exceeding the expected yield have been suggested.

It has further been suggested that better crystals of the neutral hypochlorite may be obtained by thinning the slurry in which the precipitation of the neutral compound is to occur, as by diluting it with filtrate obtained from the filtering of a previous portion of the slurry. Because of the solubility relations, thinning the slurry with water is uneconomical due to solution of the neutral compound and its loss in the increased amount of filtrate. The use of several volumes of filtrate per volume of chlorinated milk of lime slurry has been suggested. Such procedure calls for a considerable increase in tank capacity and involves the handling of large amounts of filtrate which is corrosive to pipes and pumps.

One difficulty of operating in the above described manner is the small proportion of the chlorinating time during which the neutral compound is being crystallized. If the slurry formed by chlorinating the milk of lime until the lime has been substantially converted to the dibasic compound is cooled to 15 to 25° C., and further chlorinated to form the neutral compound, solution of the dibasic compound takes place for a considerable period. For a brief interval the solution then becomes saturated, and subsequently supersaturated with respect to the neutral compound, and spontaneous crystallization of many fine crystals will occur unless a large amount of neutral hypochlorite seed crystals is present. Then follows a period during which growth of the crystals of the neutral compound takes place. This period is but a small portion of the entire chlorination period. For example, if the milk of lime slurry is made up of 1 part lime to 2.5 parts water, less than one-fifth of the chlorine will be added during the period of growth of the neutral compound crystals. Consequently, the neutral crystals do not have sufficient time to grow.

Poorly filterable slurries are objectionable because they form cakes containing large amounts of mother liquor. This mother liquor is rich in calcium chloride. Because of its hygroscopic properties, calcium chloride resists drying and causes considerable loss of hypochlorite by decomposition during the drying operation. When the milk of lime is chlorinated, equimolecular portions of calcium chloride and calcium hypochlorite are formed in the solution. One-half or more of the calcium hypochlorite formed is usually precipitated as the neutral compound while all of the calcium chloride stays in solution. The amount of calcium chloride remaining in the cake decreases as filterability increases.

To reduce the calcium chloride content, it has been proposed to prepare crystals of the dibasic compound and to separate these as by centrifuging or filtration. The separated crystals of the dibasic compound may then be suspended in water and the chlorination continued until neutral calcium hypochlorite is formed. By this separation of the dibasic compound crystals from the mother liquor in which they are formed, a considerable proportion of the calcium chloride is removed and therefore the final slurry of neutral calcium hypochlorite contains a smaller proportion of calcium chloride. Consequently, for the same size of crystals and equal filterability, the amount of calcium chloride in the filtercake will be less so that drying thereof is simplified. It has also been claimed that larger crystals of the neutral compound can be crystallized from solutions of lower calcium chloride content than would be obtained by ordinary chlorination.

Separation and resuspension of the dibasic compound crystals are, however, objectionable as a plant procedure because of the greatly increased tank capacity required and because of the increased losses of calcium hypochlorite in the filtrates. Also, the filtrate resulting from filtration of the neutral compound slurry is higher in calcium hypochlorite content than that obtained by ordinary chlorination. To make such operation economical, it is necessary to treat this filtrate with lime to effect the recovery of basic hypochlorite therefrom which can be filtered off and returned to the process. If this recovery step is practiced with both the ordinary and with the basic compound separation and resuspension type of chlorination, the loss of calcium hypochlorite is greater in the latter case due to the larger volume of filtrate from the recovered basic hypochlorites. Further, since water enters the second stage of such chlorination processes with the separated dibasic compound, less water may be added to the lime in preparing the initial milk of lime slurry, if an excessive amount of filtrate is to be avoided, and this would necessitate the handling of objectionably thick milk of lime slurries.

In accordance with my improved process, slurries of neutral calcium hypochlorite of excellent filterability may be prepared while avoiding the above-mentioned difficulties of the previously proposed methods.

Briefly, I have discovered that slurries of neutral calcium hypochlorite crystals of excellent filterability may be prepared by adding, preferably at a uniform rate, a slurry of dibasic calcium hypochlorite to a previously prepared slurry of neutral calcium hypochlorite with simultaneous chlorination by injecting chlorine into the composite slurry at a rate approximately equivalent, chemically, to the rate at which the disbasic slurry is added. The gravity of the liquid phase of the dibasic slurry used should not exceed 47° Twaddell and preferably should be between 40 and 44° Twaddell. The free lime content of the composite slurry is advantageously maintained at a value below 1.5%, by weight, throughout its chlorination.

In this chlorination, the chlorine reacts with the calcium hydroxide present in the dibasic slurry as indicated by the equation $$Ca(OCl)_2.2Ca(OH)_2 + 2Cl_2 \rightarrow 2Ca(OCl)_2 + CaCl_2$$

In other words, two moles of chlorine are required to react with each mole of the dibasic hypochlorite, one mole of chlorine being required to react with each mole of $Ca(OH)_2$, to form the neutral calcium hypochlorite. Reference herein and in the appended claims to equivalent quantities of chlorine and dibasic hypochlorite slurry will be understood to have reference to this reaction.

The process of the present invention has the distinct advantage of being adapted to continuous operation. For example, a supply of the dibasic slurry may be maintained and a portion of this slurry constantly supplied to and admixed with the neutral slurry with simultaneous chlorination. However, if desired, the addition of the dibasic slurry to the neutral slurry may be intermittent.

In the continuous operation of this process a quantity of the neutral slurry is maintained in the mixing and chlorinating chamber. In the batch type of operation a quantity of the neutral slurry from a previous run may be used. For example, a portion of the neutral slurry from a previous run may be allowed to remain in the mixing and chlorinating chamber for use in starting the following run. In either type of operation the neutral slurry for the initial run may be prepared in a conventional manner, for instance by the chlorination of a lime slurry or of a slurry of the dibasic compound, advantageously to a point where its free lime content is below 1.5% by weight and usually about 0.5% by weight, depending upon the operating conditions to be employed.

The dibasic compound slurry used in accordance with the present invention may be prepared, for instance, by chlorinating a milk of lime slurry until the clear liquor, on separation from the slurry, shows the desired gravity. It is not necessary to filter or centrifuge the dibasic compound and resuspend it, as has been previously suggested, though such procedure may be followed if desired. Likewise, a portion of the mother liquor from the dibasic slurry may be removed by settling and drawing off part of the clear supernatant liquor at a favorable stage in the chlorination. Such variations may be advantageous, particularly if the filtrate from the neutral compound is treated with lime to recover basic hypochlorite compounds which are added to the milk of lime slurry prior to or during its chlorination, so as to avoid the accumulation of calcium chloride in the system.

One satisfactory method of preparing the dibasic compound slurry is as follows: A milk of lime slurry is chlorinated until substantially all the calcium hydroxide has been converted to the dibasic compound. At this point, if desired, the chlorination may be stopped, the slurry settled and a portion of the supernatant liquid discarded. The remaining slurry is then chlorinated until the clear liquor on separation from the slurry shows a gravity of 40 to 44° Twaddell. The chlorination of the milk of lime may be started at ordinary room temperature and the temperature allowed to rise to 35 to 45° C. and held there during continued chlorination until the clear liquor separated from the slurry reaches the desired gravity.

My present invention is not dependent upon the use of any particular method of preparing the dibasic slurry used in accordance therewith. However, best results have been obtained where the crystals of the dibasic slurry were relatively large and well formed.

In experimental runs I have found it possible and advantageous to continue the chlorination of the dibasic slurry until the clear liquor separated from the slurry shows a gravity of 47° Twaddell. As precipitation of the hemibasic compound may occur at slightly higher gravities, we prefer to stop the chlorination at 44° Tw. or preferably to proceed to this point, stop the chlorination and continue stirring for a short period. The gravity of the liquid phase will fall slightly as equilibrium with respect to the dibasic compound is established. If the gravity should fall below 40° Tw., for instance, the slurry may be further chlorinated to bring the gravity above 40° Tw.

In preparing the neutral hypochlorite slurry in accordance with my present method, the previously prepared dibasic slurry is passed, preferably at a constant rate, into a chamber or tank partly filled with a previously prepared slurry of neutral calcium hypochlorite, the free lime content of which is advantageously less than 1.5% and preferably about 0.5% by weight. Simultaneously, chlorine is added to the slurry in the mixing and chlorinating chamber, which for convenience is herein sometimes referred to as the composite slurry, at a rate dependent upon the composition of the dibasic slurry and the rate at which the dibasic slurry is added, and such that the alkalinity of the composite slurry is maintained substantially constant. During the chlorination and addition of the dibasic slurry, the composite slurry is cooled and preferably kept at a temperature between 15 and 20° C. A temperature as high as 25° C. may be maintained providing the alkalinity is kept above 0.5% but such higher temperatures are inadvisable as there is a tendency of the slurry to foam and foaming interferes with the circulation and hence the growth of the crystals of the neutral compound. Similarly, I have found that temperatures as low as 10° C. may be employed but that at lower temperatures the solution tends to become supersaturated to an undesirable degree with the neutral compound so that unsatisfactory slurries may result unless the rate of chlorination is quite slow.

In the batch-type of operation, when the mixing and chlorinating chamber is substantially filled, the addition of the dibasic slurry is discontinued and the neutral slurry therein may be further chlorinated, for instance, to a lime content of 0.1 to 0.2%, at which point a portion of the neutral slurry may be transferred to storage, leaving in the chamber sufficient neutral slurry for the resumption of the operation. The operation is resumed by the addition of further dibasic slurry with simultaneous chlorination, as just described, until the chamber is again filled or until the desired quantity of neutral slurry has been prepared.

I have found that a dibasic slurry, the clear liquid of which upon separation from the slurry has a gravity of 40 to 47° Tw., may be stored at ordinary temperatures without formation of undesirable basic compounds or appreciable change in the size or shape of the crystals of the dibasic compound. Likewise, I have found that the slurry of neutral calcium hypochlorite may be stored without alteration providing the free lime content is not over 0.5%. For short periods such as one hour, the neutral slurry having higher lime contents, for instance up to 1%, may be stored without change, and for still shorter periods the lime content may be up to 1.5%. Slurries of the dibasic compound, the solutions of which are of more than 47° Tw. gravity, should not be stored, as they may alter, the dibasic compound changing into the hemibasic compound. Similarly, a slurry of the neutral compound containing more than 1.5% free lime should not be stored at any temperature, as fine crystals of the hemibasic compound may form and seriously impair the filterability. These fine crystals could be partly removed by slow, careful chlorination of the mixed slurry but the final slurry of the neutral compound would be less filterable than one formed without such storage period.

By reason of the fact that these slurries of suitable gravity and free lime content may be stored without change in the size or character of their solid constituents, a supply of the dibasic slurry may be maintained for the operation of the process and interruption of the process by failure of the chlorine supply or of the pumps or cooling equipment does not result in poorer filterability of the final neutral slurry. Partly chlorinated milk of lime slurries, the solution phase of which has a gravity of less than 30° Tw., should not be stored, due to the formation of undesirable basic compounds which become serious at temperatures below about 23° C. and may result in complete blockage of tanks and lines.

In accordance with my invention, I have found it particularly advantageous to use dibasic slurries which consist of crystals of the dibasic compound and liquid solutions of 40 to 47° Tw. gravity. However, my improved process has been successfully operated using dibasic slurries, the gravity of the liquid solution of which was as low as 34° Tw. The use of such low gravity slurries introduces difficulties and ordinarily the slurry of the neutral compound obtained by their use is not as filterable as that obtained by use of dibasic slurries having a liquid phase of 40° to 47° Tw. gravity. Dibasic slurries, the liquid phase of which has gravities as low as 30° Tw., may be used with advantage but the dibasic crystals present in dibasic slurries, having a liquid phase of 35° Tw. gravity or less, have sharp edges which may provide nuclei for undesirable small crystals of the neutral compound during the subsequent chlorination. When the liquid phase of the dibasic slurry has a gravity of 40° to 47° Tw., and particularly if the gravity is above 44° Tw., these edges have been dulled by solution of part of the dibasic crystals during the chlorination required to attain such gravity.

There is a further advantage in employing slurries of the dibasic compound, the liquid phase of which is of 40° to 47° Tw. gravity. This is the advantage of easier mixing of such dibasic slurries with the neutral slurry and a more uniform concentration in the mixing and chlorinating chamber. Precipitation of the neutral compound may be effected, for example, from solutions of 50 to 55° Tw. gravity. The addition of a dibasic slurry having a gravity of 30 to 35° Tw. to such neutral slurry may cause serious dilution locally, so that the concentration of dissolved salts may vary seriously throughout the mixing and chlorinating chamber. By the addition of a dibasic slurry of 40 to 44° Tw. gravity, this dilution problem is lessened to a point where it is no longer troublesome. The dilution problem is more difficult because of the fact that crystals of the neutral compound are relatively thin and fragile and violent stirring cannot be employed during their precipitation as such stirring would tend to break the crystals into small fragments and seriously reduce the filterability of the final neutral slurry. Vigorous stirring would also tend to introduce foam into the slurry which would seriously impair the filterability.

Instead of preparing the dibasic slurry in advance and storing it for subsequent use, the preparation of the dibasic slurry, and its subsequent use in preparing the neutral slurry, may with advantage be combined in a unitary continuous operation. For example, I have found that such continuous operation may advantageously be carried on in four tanks constructed of corrosion-resistant materials. Milk of lime and chlorine are fed continuously to the first tank, the amount of chlorine being sufficient to maintain the gravity of the solution therein between 22 and 26° Tw. The slurry from this tank, which is normally fairly thin, then flows or is pumped to the second tank to which chlorine is also admitted at a rate sufficient to maintain the gravity of the liquid phase of the dibasic slurry at 40 to 47° Tw. In the first tank the temperature is allowed to rise to about 30 to 40° C., and in the second tank it is preferably held between 35 and 40° C. by suitable cooling. The division of this chlorinating operation into two stages tends to equalize the chlorinating load and to facilitate proper temperature control.

The dibasic slurry from said second tank may be passed continuously to the third tank containing the neutral slurry previously described, wherein it is chlorinated at a rate sufficient to keep the free lime content of the composite slurry under 1.5% and preferably between 0.5 and 1.0% by weight. The neutral slurry may be passed continuously from the third tank to the final tank to which a slow stream of chlorine is admitted which reduces the remaining lime to the desired residual which may be from, say, 0.05 to 0.25% by weight.

In the third tank the temperature is advantageously kept between 15 and 25° C., and preferably between 15 and 18° C., by suitable cooling. The temperature maintained in the final tank will depend upon the intended disposition of the low alkalinity neutral slurry therein. If this slurry is to be used promptly, as by continuous filtration or centrifuging, the temperature may with advantage be from 15 to 25° C. If, however, the slurry from this fourth tank is to be stored for an extended period of time, it should be cooled down, for instance, to 0° C. prior to storage.

While the above-mentioned temperatures have been found particularly suitable for this type of operation of my improved process, other temperatures may be used. However, the use of temperatures other than those within the specified range is apt to lead to reduced capacity of the operation and to poorer filterability of the final slurry of neutral compound.

In continuous operation such as described above, the throughput may be varied widely according to the chlorine supply available and the desired filterability of the final slurry. A throughput of one-half of one per cent of the volume of each tank per minute has been found to be advantageous for commercial operation. With this throughput the capacity of the system per unit of tank volume is considerably in excess of that obtainable with processes which involve the separation of the dibasic compound and its resuspension in water. This is an important advantage of my improved process, particularly so since all equipment must be constructed of corrosive-resistant material and is consequently quite expensive.

The following specific example is given as a detailed illustration of the improved process of my present invention as applied to the discontinuous or batch-type of operation. 3500 pounds of lime of 95% $Ca(OH)_2$ content and 8900 pounds of water were made into a milk of lime slurry and charged to a 1500 gallon tank equipped with a slow speed turbine type agitator. 2230 pounds of chlorine was added, the temperature being allowed to rise to 37° C. and held thereby circulating cooling water through coils located within the tank. When all the chlorine had been added, the solution was stirred for ten minutes and the clear liquor was found to have a gravity of 44° Tw.

This dibasic slurry was then pumped at the rate of 8 gallons per minute into a mixing and chlorinating tank also having a capacity of 1500 gallons and which was half-filled with previously prepared neutral calcium hypochlorite slurry having a calcium hydroxide content of approximately 0.1% by weight. The free lime content of the neutral slurry was allowed to increase to 0.5% and at this point the introduction of chlorine into the tank was started at a rate equal to approximately 300 pounds per hour. The chlorine was added in the liquid form, being passed through a rotormeter tube calibrated at 50 to 1500 pounds per hour and then through a needle valve into the slurry. The rate at which the chlorine was added was adjusted so as to hold the free lime content of the slurry at 0.5%.

At the end of 90 minutes half of the dibasic slurry and 450 pounds of chlorine had been added. At this point addition of the dibasic slurry was stopped and the addition of chlorine continued for about 10 minutes at a slightly reduced rate so as to reduce the alkalinity of the resultant neutral slurry to 0.1%, expressed as calcium hydroxide. 720 gallons of the resulting neutral slurry were then discharged to storage and the cycle repeated, converting the remaining 720 gallons of dibasic slurry to neutral slurry. The temperature of the neutral slurry was maintained between 15 and 17° C. during addition of the chlorine by circulating brine through cooling coils positioned therein. The resulting slurry of the neutral compound was found to be of good filterability.

The following is a specific illustration of my improved method of preparing slurries of neutral calcium hypochlorite as applied to the continuous type of operation. A dibasic slurry, the liquid phase of which had a gravity of 43 to 44° Tw., prepared by chlorinating a slurry of 3500 pounds of lime of 95% $Ca(OH)_2$ content and 8900 pounds of water, as previously described, was charged at the rate of 8 gallons per minute into a mixing and chlorinating tank of 1500 gallons capacity half filled with a previously prepared slurry of neutral calcium hypochlorite having a lime content of 0.5% to 1.0% by weight. Simultaneously therewith chlorine was added at the rate of approximately 300 pounds per hour. The temperature of the neutral slurry was held down to 15 to 17° C., by circulating refrigerated brine through cooling coils submerged therein. Samples of the neutral slurry were taken from time to time and tested for free lime content and the rate of chlorine addition adjusted to keep the lime content of the neutral slurry between 0.5% and 1.0%. It was found that the alkalinity could be kept within this range with infrequent adjustment of the chlorine flow, for instance one adjustment per hour.

As the operation continued, the neutral slurry was permitted to overflow from the mixing and chlorinating tank into a second tank. Gaseous chlorine under approximately 20 pounds pressure was supplied to this second tank at an average rate of about 20 pounds per hour to complete the chlorination of the neutral slurry, the lime content being reduced to approximately 0.1% by weight. In this second tank the slurry was cooled to 0°–+5° C. and from this tank the final slurry was drawn off to storage.

After the continuous operation of this process, as above described, over a period of 10 hours a portion of the final slurry was withdrawn from storage and was found to be of good filterability. A portion thereof was filtered through a rotary vacuum filter and without using the water spray the resultant cake had the following analysis:

| | Per cent |
|---|---|
| $Ca(OCl)_2$ | 53.6 |
| $CaCO_3$ | 1.0 |
| $Ca(OH)_2$ | 0.4 |
| $CaCl_2$ | 7.0 |
| Water | 38.0 |

By using a light spray of wash water during the filtration the calcium chlorine content of the cake was reduced to 3–4%.

I claim:

1. A process for the production of readily filterable slurries of neutral calcium hypochlorite crystals comprising adding to a previously prepared slurry of neutral calcium hypochlorite a slurry of dibasic calcium hypochlorite, the liquid phase of the latter having a gravity within the range of 30° to 47° Twaddell, while chlorinating the composite slurry at a rate such as to maintain the free lime content thereof below 1.5% by weight.

2. A process for the production of readily filterable slurries of neutral calcium hypochlorite crystals comprising adding to a previously prepared slurry of neutral calcium hypochlorite a slurry of dibasic calcium hypochlorite prepared by chlorinating milk of lime and composed of a solid phase consisting essentially of dibasic calcium hypochlorite and a liquid phase having a gravity within the range of 30° to 47° Twaddell, while chlorinating the composite slurry at a rate such as to maintain the free lime content thereof below 1.5% by weight.

3. A process for the production of readily filterable slurries of neutral calcium hypochlorite crystals comprising admixing with a slurry of neutral calcium hypochlorite a slurry of dibasic calcium hypochlorite, the liquid phase of which has a gravity within the range of 30° to 47° Twaddell and simultaneously chlorinating the composite slurry by adding chlorine thereto at a rate such as to maintain the free lime content of the composite slurry substantially constant.

4. A process for the production of readily filterable slurries of neutral calcium hypochlorite crystals comprising admixing with a slurry of neutral calcium hypochlorite having a free lime content below 1.5%, by weight, a slurry of dibasic calcium hypochlorite, the liquid phase of which has a gravity within the range of 30 to 47° Twaddell and simultaneously chlorinating the composite slurry by adding chlorine thereto at a rate such as to maintain the free lime content of the composite slurry substantially constant.

5. A continuous process for the production of readily filterable slurries of neutral calcium hypochlorite crystals comprising adding to a previously prepared slurry of neutral calcium hypochlorite at a uniform rate a slurry of dibasic calcium hypochlorite, the liquid phase of the latter having a gravity within the range of 30° to 47° Twaddell, while chlorinating the composite slurry by passing chlorine thereto at a rate substantially equivalent, chemically, to that at which the dibasic calcium hypochlorite slurry is added so as to maintain substantially constant the free $Ca(OH)_2$ content of the composite slurry.

6. A continuous process for the production of readily filterable slurries of neutral calcium hypochlorite crystals comprising maintaining a quantity of neutral calcium hypochlorite slurry in a mixing and chlorinating chamber, continuously passing thereto a slurry of dibasic calcium hypochlorite, the liquid phase of the latter having a gravity within the range of 30° to 47° Twaddell, while chlorinating the composite slurry by continuously passing chlorine thereto at a rate substantially equivalent, chemically, to that at which the dibasic calcium hypochlorite slurry is added, continuously withdrawing neutral calcium hypochlorite slurry from the chlorinating and mixing chamber to a second chamber and further chlorinating the withdrawn neutral slurry in the said second chamber.

7. A process for the production of readily filterable slurries of neutral calcium hypochlorite crystals which comprises simultaneously adding to a previously prepared slurry of neutral calcium hypochlorite chlorine and a slurry of dibasic calcium hypochlorite, the liquid phase of the latter having a gravity within the range of 30° to 47° Twaddell, the chlorine being added at a rate substantially equivalent, chemically, to the rate at which the slurry of dibasic calcium hypochlorite is added.

8. A process for the production of readily filterable slurries of neutral calcium hypochlorite crystals which comprises simultaneously adding to a previously prepared slurry of neutral calcium hypochlorite chlorine and a slurry of dibasic calcium hypochlorite, the liquid phase of the latter having a gravity within the range of 40° to 47° Twaddell, the chlorine being added at a rate substantially equivalent, chemically, to the rate at which the slurry of dibasic calcium hypochlorite is added.

9. A process for the production of readily filterable slurries of neutral calcium hypochlorite crystals which comprises simultaneously adding to a previously prepared slurry of neutral calcium hypochlorite chlorine and a slurry of dibasic calcium hypochlorite, the liquid phase of the latter having a gravity within the range of 30° to 47° Twaddell, the chlorine being added at a rate substantially equivalent, chemically, to the rate at which the slurry of dibasic calcium hypochlorite is added, and maintaining the composite slurry at a temperature of between about 10° to 25° C. while the chlorine and slurry of dibasic calcium hypochlorite are being added thereto.

10. A process for the production of readily filterable slurries of neutral calcium hypochlorite crystals which comprises simultaneously adding to a previously prepared slurry of neutral calcium hypochlorite chlorine and a slurry of dibasic calcium hypochlorite prepared by chlorinating milk of lime and composed of a solid phase consisting essentially of dibasic calcium hypochlorite and a liquid phase having a gravity within the range of 30° to 47° Twaddell, the chlorine being added at a rate substantially equivalent, chemically, to the rate to which the slurry of dibasic calcium hypochlorite is added.

11. A process for the production of readily filterable slurries of neutral calcium hypochlorite crystals which comprises simultaneously adding to a previously prepared slurry of neutral calcium hypochlorite chlorine and a slurry of dibasic calcium hypochlorite, the liquid phase of the latter having a gravity within the range of 30° to 47° Twaddell, the chlorine being added at a rate substantially equivalent, chemically, to the rate at which the slurry of dibasic calcium hypochlorite is added, and thereafter discontinuing the addition of the slurry of dibasic calcium hypochlorite while continuing the chlorination further to reduce the calcium hydroxide content of the resultant neutral slurry.

HOMER LOUIS ROBSON.